US010050913B2

(12) United States Patent
Yao et al.

(10) Patent No.: US 10,050,913 B2
(45) Date of Patent: Aug. 14, 2018

(54) METHOD FOR SENDING AND RECEIVING ELECTRONIC MAIL OF INTERNATIONAL MULTILINGUAL MAIL BOX

(71) Applicant: Computer Network Information Center, Chinese Academy of Sciences, Beijing (CN)

(72) Inventors: Jiankang Yao, Beijing (CN); Ning Kong, Beijing (CN); Shuo Shen, Beijing (CN); Bing Liu, Beijing (CN)

(73) Assignee: Computer Network Information Center, Chinese Academy of Sciences, Beijing (CN)

( * ) Notice: Subject to any disclaimer, the term of this patent is extended or adjusted under 35 U.S.C. 154(b) by 226 days.

(21) Appl. No.: 14/894,569

(22) PCT Filed: Dec. 18, 2013

(86) PCT No.: PCT/CN2013/089858
§ 371 (c)(1),
(2) Date: Nov. 30, 2015

(87) PCT Pub. No.: WO2015/074305
PCT Pub. Date: May 28, 2015

(65) Prior Publication Data
US 2016/0308804 A1    Oct. 20, 2016

(30) Foreign Application Priority Data
Nov. 25, 2013 (CN) .......................... 2013 1 0607127

(51) Int. Cl.
*H04L 12/58* (2006.01)

(52) U.S. Cl.
CPC .......... *H04L 51/066* (2013.01); *H04L 51/22* (2013.01); *H04L 51/28* (2013.01)

(58) Field of Classification Search
CPC ........ H04L 51/066; H04L 51/22; H04L 51/28
See application file for complete search history.

(56) References Cited

FOREIGN PATENT DOCUMENTS

WO    WO-2014036791 A1 * 3/2014 ............ H04L 51/22

OTHER PUBLICATIONS

WO2014036791 English Translation (Year: 2014).*

* cited by examiner

*Primary Examiner* — Angela Nguyen
(74) *Attorney, Agent, or Firm* — SV Patent Service

(57) ABSTRACT

Disclosed are a method for sending and receiving emails using international multilingual mailbox. The method includes: 1) setting a field 1 in a header of an email in an international multilingual mailbox, and recording a substitute English email address corresponding to the international multilingual mailbox; setting a field 2 in the header to describe the email's sender's email address in English; 2) before a sending an email generated by a terminal that supports international multilingual mailbox, checking whether the receiving terminal of the email supports international multilingual mailbox; if not, sending the email according to the English email address in the field 1; and if yes, directly sending the email; and 3) extracting the field 2 from the header of the email by the receiving terminal, determining the corresponding language, and sending a prompt in English or the predetermined language to the email recipient. The present method resolves the deficiency in the transition mechanism of the international email systems, and helps people more conveniently communicate with each other using multilingual email addresses.

7 Claims, 1 Drawing Sheet

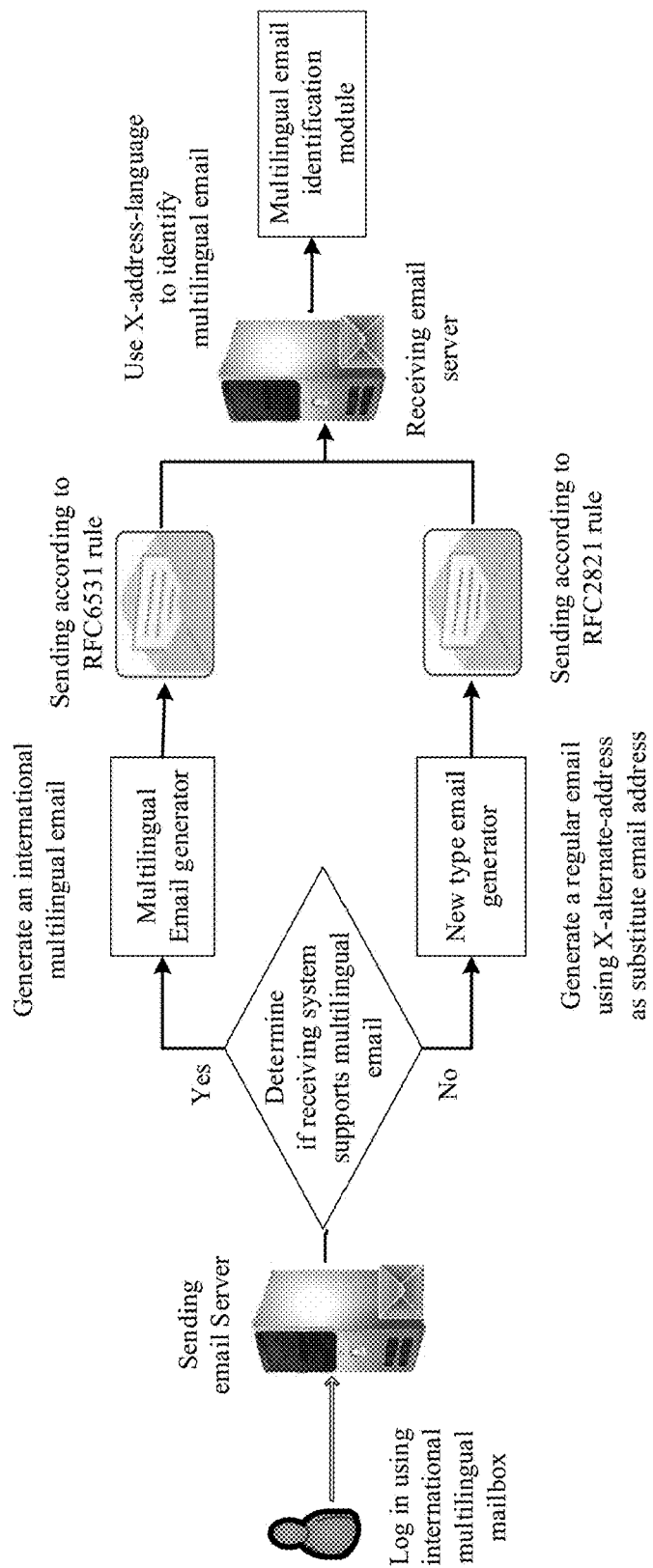

METHOD FOR SENDING AND RECEIVING ELECTRONIC MAIL OF INTERNATIONAL MULTILINGUAL MAIL BOX

TECHNICAL FIELD

The present invention relates to a method for receiving and sending emails, and in particular, the field of network technology associated with an international multilingual mailbox that can send and receive email messages.

BACKGROUND OF THE INVENTION

International multilingual mailbox electronic email, or simply multilingual email, refers to emails that use international multilingual mailboxes. International multilingual mailbox, also known as an international email address, refers to an email address that contains Chinese, Japanese and other non-English characters, such as "钱华林@中科院, 中 国". RFC6531 and RFC6532 technology standards issued by IETF in 2012 specify the technical standards for international multilingual mailbox emails.

Currently there is a coexistence of systems that support the technical standards of international multilingual mailbox emails and systems that do not support those technical standards. Sending and receiving email messages between these two types of systems are still an unresolved problem.

SUMMARY OF THE INVENTION

To address technical problems in conventional technologies, the object of the present invention is to provide a method for sending and receiving emails using international multilingual mailboxes, in order to help communication among users.

Aspects of the present invention include:

A method for sending and receiving emails using international multilingual mailboxes, comprising the steps of:

1) setting an X-alternate-address field in the header of an email message in an international multilingual mailbox to record a substitute English email address corresponding to the international multilingual mailbox; and setting an X-address-language field in the header to set a predetermined language to describe email sender's email address;

2) before sending an email generated by a sending terminal that supports international multilingual mailbox, checking whether the receiving terminal of the email supports international multilingual mailbox; if the receiving terminal does not support emails of international multilingual mailbox, sending the email according to the English email address in the X-alternate-address field, proceeding to step 4); if the receiving terminal supports emails of international multilingual mailbox, directly sending the email with the field of X-alternate-address in the email header, proceeding to step 3);

3) extracting the X-address-language field from the header of the email by the receiving terminal, determining the corresponding predetermined language, and sending a prompt in English or the predetermined language to the email recipient; and 4) receiving the email by the receiving terminal.

Further, the sender's email address can be named using a language specified in UTF-8 mailbox.

Further, the predetermined language in step 1) can be the English.

Further, the predetermined language is the language used by an email server at the receiving terminal.

Further, when the email recipient replies to the email, the method can further include: extracting the X-alternate-address field from the header to obtain reply email's receiving address, by an email server at the receiving terminal that supports emails of international multilingual mailbox.

Further, when the email recipient replies to the email, the method can further include: using the email sender's international multilingual email address as reply email's receiving email address, by an email server at the receiving terminal that supports emails of international multilingual mailbox.

Further, the email server at the sending terminal that supports emails of international multilingual mailbox can generate the email according to RFC6532 protocol. The email server at the receiving terminal that supports emails of international multilingual mailbox can send the email in accordance with the RFC6531 protocol.

The present invention establishes mailbox address fully in English for each multilingual mailbox address that contain non-English characters. The present invention can facilitate email transmissions between systems that support the technical standards of international multilingual mailbox and the system that do not support those technical standards, as well as better identification of international multilingual mailboxes. Because existing technologies for multilingual mailbox does not provide mechanisms to support sending and receiving emails with system that do not support the technical standards of international multilingual mailbox, the current multilingual mailbox email system cannot support multilingual email communications with regular email systems (not in compliance with the standards). The present invention specifically adds two new fields in email header. It improves the existing multilingual email messaging system by adding two fields in the email headers in sending and receiving emails. Using these two fields, the system and the user can better identify multilingual mailbox, thereby facilitating multilingual email communications. The following describes the example for Chinese email addresses.

The presently disclosed method has first designed two new field in email header:

The first field: X-alternate_address: ASCII email address. This field indicates substitute English email address that corresponds to the multilingual mailbox. The ASCII email address can only be expressed in English characters.

The second one: X-address-language: Language Name This field indicates which one of the languages specified in UTF-8 mailboxes that are used in the email sender's email address. The Language Name is in English, which is in compliance with the specific provisions of the W3C (http: followed by //People.w3.org/rishida/names/languages.html). For example, in Language Name, Chinese represent Chinese language. For example:

Received: from unknown218 241.118.6 (HELO ironportc370m.cnnic.cn.) (218.241.118.6)
by 218.241.118.7 with SMTP; Wed, 29 May 2013 11: 18:20 +0800
X-IronPort-Anti-Spam-Filtered: true
X-IronPort-AV: E=Sophos; i="4.87, 762, 1363104000"; d="scan'208"; a="7425305"
X-alternate-address: ceshi@cas.cn.
X-address-language: Chinese
Received: from email-bl21p0208 outbound.protection. outlook.com ( . . . HELO na01-bl2-obe.outbound.protection. outlook com) ([207.46.163.208])

by ironportc370m.cnnic.cn with ESMTP; 29 May 2013 11:18:17 +0800
Received: from mail210-chl (localhost [127.0.0.1]) by
From: 张一 <测试@中科院.中国>
To: 李四 <测试@网络中心.中国>
Subject: TEST The domain names and account names of traditional mailboxes must be named in English, such as, ceshi@cas.cn. After the implementation of Chinese email technical standards, users can use Chinese to email domain name and account name, namely: 测试@中 科院.中国. Chinese email domains can be used for reception, transmission, and other related email operations.

The process flow of the present invention shown in FIG. 1. When an email sender sends an email, according to international protocol RFC6531, the sender's email server can detect if the email server at the receiving end supports the standard international multilingual email mailbox. If the email receiving system does not support international multilingual email mailbox system, the new email generator based on the presently disclosed technology uses the X-alternate-address field to automatically find a substitute email address in English to generate a regular email, which can be sent according to RFC2821 rules to the receiving email server.

If the sender and the receiving email servers both support RFC6531 protocol, an international multilingual email can be generated and sent normally. After receiving the email, the email recipient may not recognize the country of origin of the language in the email address, such as in the example when South Koreans receive emails containing Chinese addresses. The recipient's email processing system enabled by the present invention can now use a multilingual identification module to extract the corresponding language from X-address-language field in the email header, and to prompt the user in English or the language used by sender's email system. In the reply, the receiving email processing system enabled by the invention method can prompt the user to choose to find the corresponding English email address from the X-alternate-address field in the email header as the next receiving email address, or use sender's multilingual email address as the next receiving email address.

Compared with the prior art, the advantages of the presently disclosed methods include the following advantages:

The present invention overcomes deficiencies in the transition mechanisms in international email systems, and allows people more conveniently communicate using multilingual email addresses. The present invention can facilitate email transmissions between systems that support the technical standards of international multilingual mailbox and the system that do not support those technical standards, as well as better identification of international multilingual mailboxes.

Two new fields are creatively added in email headers. The first field: X-alternate_address: ASCII email address. This field indicates substitute English email address that corresponds to the Chinese mailbox. The second one: X-address-language: Language Name This field indicates which one of the languages specified in UTF-8 mailboxes that are used in the email sender's email address. Mechanisms of using this field are also proposed.

BRIEF DESCRIPTION OF THE DRAWINGS

FIG. 1 is a flowchart in accordance with the present invention.

DETAILED DESCRIPTION OF THE INVENTION

Examples of the email header are as follows:
Received: from unknown218.241.118.6 (HELO ironportc370m.cnnic.cn) (218.241.118.6)
by 218.241.118.7 with SMTP; Wed, 29 May 2013 11:18:20 +0800
X-IronPort-Anti-Spam-Filtered: true
X-IronPort-AV: E=Sophos; i="4.87, 762, 1363104000"; d="scan '208"; a="7425305"
X-alternate-address: ceshi@cas.cn.
X-address-language: Chinese
Received: from tnail-bl21p0208.outbound, protection.outlook.com (HELO na01-bl2-obe.outbound.protection.outlook.com) ([207.46.163.208]).
by ironportc370m.cnnic.cn with ESMTP; 29 May 2013 11:18:17 +0800
Received: from mail210-chl (localhost [127.0.0.1]) by
From: 张一 <测试@中科院.中国>
To: Kim <test@nic.kr>
Subject: TEST The domain names and account names of traditional mailboxes must be named in English, such as, ceshi@cas.cn. After the implementation of Chinese email technical standards, users can use Chinese to email domain name and account name, namely: 测试@中 科院.中国. Chinese email domains can be used for reception, transmission, and other related email operations.

When the email sender 测试@中科院.中国 sends an email, if it is discovered that the email recipient system does not support international multilingual email mailbox system, the disclosed system and method uses the X-alternate-address field to automatically find a substitute email address in English, ceshi@cas.cn, to generate a regular email, which can be resent according to RFC2821 rules.

If the international multilingual mailbox can send email to work properly, after receiving the email, the email recipient at "test@nic.kr" may not recognize the country of origin of the language in the email address, such as in the example when South Koreans receive emails containing Chinese addresses. The recipient's email processing system enabled by the present invention can now use a multilingual identification module to extract from X-address-language field in the email header, to find the corresponding language. In reply, if this email users may prefer to use an English email address, so the disclosed system and method automatically finds the corresponding English email address "ceshi@cas.cn" from X-alternate-address field in the email header.

While the invention disclosed embodiments described above, but it is not intended to limit the present invention. Any skilled in the art, without departing from the spirit and scope of the present invention can be used for any alterations or equivalents. The scope of the present invention should be defined by the scope of the claims.

What is claimed is:

1. A method for sending and receiving emails using international multilingual mailboxes, comprising the steps of:
   1) setting an X-alternate-address field in the header of an email message in an international multilingual mailbox to record a substitute English email address corresponding to the international multilingual mailbox; and setting an X-address-language field in the header to set a predetermined language to describe email sender's email address;

2) before sending an email generated by a sending terminal that supports international multilingual mailbox, checking whether the receiving terminal of the email supports international multilingual mailbox;
3) if the receiving terminal supports emails of international multilingual mailbox, directly sending the email with the field of X-alternate-address in the email header; extracting the X-address-language field from the header of the email by the receiving terminal, determining the corresponding predetermined language, and sending a prompt in English or in the predetermined language to the email recipient; and
4) if the receiving terminal does not support emails of international multilingual mailbox, sending the email according to the English email address in the X-alternate-address field; and receiving the email by the receiving terminal.

2. The method according to claim 1, wherein the sender's email address is named using a language specified in UTF-8 mailbox.

3. The method according to claim 1, wherein the predetermined language in step 1) is English.

4. The method according to claim 1, wherein the predetermined language is the language used by an email server at the receiving terminal.

5. The method according to claim 1, wherein when the email recipient replies to the email, the method further comprising:
extracting the X-alternate-address field from the header to obtain reply email's receiving address, by an email server at the receiving terminal that supports emails of international multilingual mailbox.

6. The method according to claim 1, wherein when the email recipient replies to the email, the method further comprising:
using the email sender's international multilingual email address as reply email's receiving email address by an email server at the receiving terminal that supports emails of international multilingual mailbox.

7. The method according to claim 6, further comprising:
generating the email according to RFC6532 protocol, by the email server at the sending terminal that supports emails of international multilingual mailbox; and
sending the email in accordance with RFC6531 protocol, to the email server at the receiving terminal that supports emails of international multilingual mailbox.

\* \* \* \* \*